(12) United States Patent
Dally

(10) Patent No.: US 9,069,684 B2
(45) Date of Patent: Jun. 30, 2015

(54) SYSTEM, METHOD, AND COMPUTER PROGRAM PRODUCT FOR INVALIDATING CACHE LINES

(75) Inventor: William Dally, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 130 days.

(21) Appl. No.: 13/550,487

(22) Filed: Jul. 16, 2012

(65) Prior Publication Data

US 2014/0019691 A1  Jan. 16, 2014

(51) Int. Cl.
*G06F 13/00* (2006.01)
*G06F 13/28* (2006.01)
*G06F 12/08* (2006.01)

(52) U.S. Cl.
CPC .................. *G06F 12/0895* (2013.01)

(58) Field of Classification Search
None
See application file for complete search history.

(56) References Cited

U.S. PATENT DOCUMENTS

| | | | |
|---|---|---|---|
| 5,940,856 A * | 8/1999 | Arimilli et al. | 711/119 |
| 2003/0028728 A1 * | 2/2003 | Ito | 711/118 |
| 2009/0235029 A1 * | 9/2009 | Mouton et al. | 711/128 |

* cited by examiner

*Primary Examiner* — Eric S Cardwell
(74) *Attorney, Agent, or Firm* — Zilka-Kotab, PC

(57) ABSTRACT

A system, method, and computer program product are provided for invalidating cache lines. In use, one or more cache lines that hold data from within a region of a memory address space are invalidated.

18 Claims, 4 Drawing Sheets

SYSTEM, METHOD, AND COMPUTER PROGRAM PRODUCT FOR INVALIDATING CACHE LINES

FIELD OF THE INVENTION

The present invention relates to memory management, and more particularly to invalidating cache lines.

BACKGROUND

Caches are widely used in current computing processes. For example, a cache may be used to store data in order to reduce an average time to access memory. However, current techniques for invalidating lines in a cache have been associated with various limitations.

For example, invalidating cache lines within a predetermined region of an address space may include reading each entry of the cache that may overlap with the region and checking whether the cache entry holds a line of the region, which may consume considerable time and energy. There is thus a need for addressing these and/or other issues associated with the prior art.

SUMMARY

A system, method, and computer program product are provided for invalidating cache lines. In use, one or more cache lines that hold data from within a region of a memory address space are invalidated.

DETAILED DESCRIPTION

Figure 1:
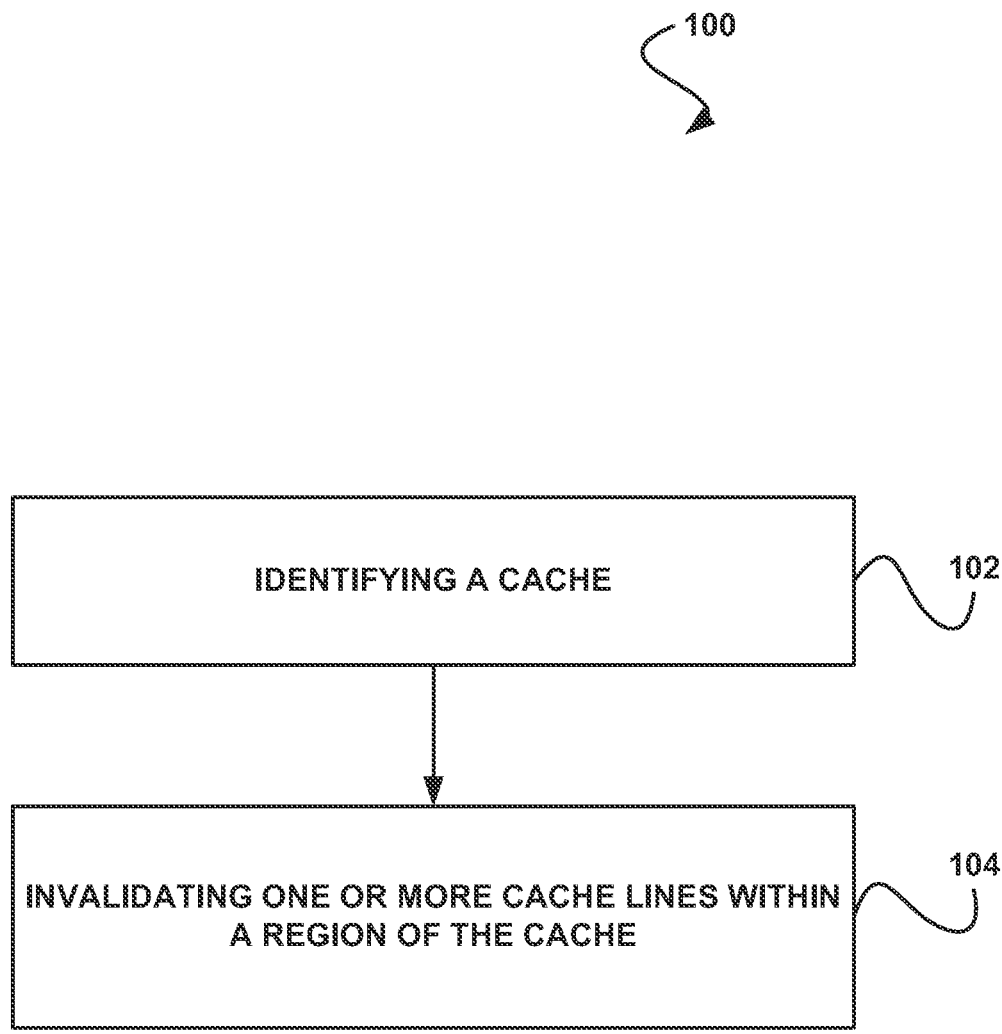
FIG. 1 shows a method for invalidating cache lines, in accordance with one embodiment.

FIG. 1 shows a method 100 for invalidating cache lines, in accordance with one embodiment. As shown in operation 102, one or more cache lines that hold data from within a region of a memory address space are invalidated. In one embodiment, the cache may include a memory element. For example, the cache may include memory for storing data (e.g., random access memory (RAM), etc.). In another example, the cache may store copies of data from other memory locations (e.g., main memory, etc.). In another embodiment, the cache may be associated with a processor. For example, the cache may store data that is retrieved by a processor in order to reduce the average time to access memory.

Additionally, in one embodiment, the cache may include one or more cache lines. For example, a cache may include a plurality of cache lines, where each cache line stores a portion of data within the cache. In yet another embodiment, the cache may include one or more region registers (e.g., region identifiers (IDs), etc.). For example, the cache may include a set of region registers, where each region register stores a state and extent of an associated region within the address space. For instance, each region register may include a starting physical address of the region, a length of the region in bytes, a current state of the region, etc.

Further, in one embodiment, the memory address space may include a range of addresses. For example, the address space may include a range of discrete memory addresses located within a memory. In another embodiment, the region of the address space may include a portion of the address space (e.g., a subset of the total address space, etc.). In another embodiment, the memory may be shared by a plurality of processors. For example, the memory may include a common memory shared by a plurality of processors.

In addition, in one embodiment, invalidating the one or more cache lines within the region of the memory address space may be performed in response to one or more actions performed by a plurality of processors sharing the memory. For example, a plurality of processors may share the common memory, but each processor may have its own separate cache. Further, the plurality of processors may operate the caches using a cache coherence protocol, or the plurality of processors may treat a region of the memory address space as either temporarily read-only or temporarily private. While in these temporary states, lines of a region may be cached without the need to track their state using the coherence protocol. In another embodiment, when a line transitions from one of these untracked states back to a cache coherent state, all lines holding data in that region may have to be invalidated, which may necessitate invalidating one or more cache lines within the region of the memory address space.

In yet another embodiment, the one or more cache lines within the region of the address space may be invalidated utilizing a content-addressable memory (CAM) circuit. For example, a CAM circuit may be incorporated into the design of the cache. In another example, the CAM circuit may include a comparator.

Further still, in one embodiment, invalidating the one or more cache lines within the region of the memory address space may include adding a region field to each cache line within the cache. For example, each cache line in a directory of a cache may include one or more bits that are designated as a region field and that store a region identifier, where the region identifier may include a numeric identifier that identifies a region of the address space associated with that cache line. In another example, each cache line in the cache may include one or more bits that are designated as a valid field, where the valid field may indicate whether its associated cache line is valid or invalid.

Also, in one embodiment, invalidating the one or more cache lines within the region of the memory address space may include receiving a region identifier. In one embodiment, the received region identifier may include the identifier of a region of the memory address space associated with one or more cache lines that are to be invalidated. In another embodiment, invalidating the one or more cache lines within the region of the memory address space may include comparing the region field of each cache line within the cache to the received region identifier. In yet another embodiment, the comparator may compare the received region identifier to each cache line within the cache.

In addition, in one embodiment, invalidating the one or more cache lines within the region of the memory address space may include determining for each cache line within the cache whether the region identifier of that cache line matches the received region identifier. In another embodiment, invalidating the one or more cache lines within the region of the memory address space may include, for each cache line within the cache, clearing the valid field of the cache line if the region identifier of that cache line matches the received region identifier.

In yet another embodiment, the valid field of a cache line may include a single bit, and clearing the valid field of a cache line may include turning the valid field to zero or false, which may invalidate the cache line. In this way, all cache lines within the cache that have region identifiers matching the received region identifier may be invalidated.

Furthermore, in one embodiment, only unmodified cache lines within the region of the memory address space may be invalidated. For example, each cache line in the cache may include one or more bits that are designated as a modified field, where the modified field may indicate whether its associated cache line has been modified. In another embodiment, during the comparison of the region field of each cache line within the cache to the received region identifier, the modified field of each cache line within the cache may be compared to zero or false. In yet another embodiment, the comparator may perform such comparison. In still another embodiment, for each cache line within the cache, the valid field of the cache line may be cleared if the region identifier of that cache line matches the received region identifier and the modified field of that cache line matches zero or false.

Further still, in one embodiment, one or more cache lines within a plurality of regions of the memory address space may be invalidated. For example, a wildcard bit (e.g., a "don't care" bit, etc.) may be substituted for a bit in the received region identifier, such that the received region identifier may match a plurality of different region fields of each cache line within the cache. In this way, cache lines from a plurality of regions of the cache may be invalidated after the region field of each cache line within the cache is compared to the received region identifier.

Also, in one embodiment, invalidating the one or more cache lines within the region of the memory address space may include adding a phase field to each cache line within the cache. For example, each cache line in a cache may include one or more bits that are designated as a phase field. In another example, the phase field may be appended onto the one or more bits within each cache line that are designated as a region field and that store a region identifier.

In another embodiment, invalidating the one or more cache lines within the region of the memory address space may include adding a phase field to each region register. For example, each region register may include one or more bits that are designated as a phase field. In another example, the region phase field may be appended onto the end of each region register.

Additionally, in one embodiment, invalidating the one or more cache lines within the region of the memory address space may include identifying a region register that corresponds to the region of the memory address space. In another embodiment, an entire region of the memory address space may be invalidated by altering the phase field of the identified region register. For example, the phase field of the identified region register may be incremented, decremented, etc.

Furthermore, in one embodiment, invalidating the one or more cache lines within the region of the memory address space may include comparing the phase field of a cache line within the cache to the phase field of the associated region register. For example, for each cache line within the cache, a region identifier stored within that cache line may be identified and matched to a region register. Additionally, the phase field of that cache line may be compared against the phase field of the identified region register matched to the cache line.

Further still, in one embodiment, invalidating the one or more cache lines within the region of the memory address space may include clearing the valid field of each cache line that has a phase field that does not match the phase field of its corresponding region register. For example, for each line within the cache, if the phase field of that cache line does not match the phase field of the identified region register matched to the cache line, the valid field of that cache line may be cleared.

Also, in one embodiment, the phase field comparing and the conditional valid field clearing may be performed by a background state machine. For example, a background state machine may use idle cache directory cycles to walk the cache and clear all valid fields of cache lines where the phase field of such cache lines does not match the phase field of the corresponding region register. In another embodiment, the background state machine may need to complete the phase field comparing and the conditional valid field clearing for a cache line before a particular value of the phase field for that region is reused.

In this way, a cache line within the cache may be considered valid only if the phase field of the cache line matches the phase field of its corresponding region register and if the valid field of the cache line indicates that the cache line is valid (e.g., the valid field matches one or true, etc.).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
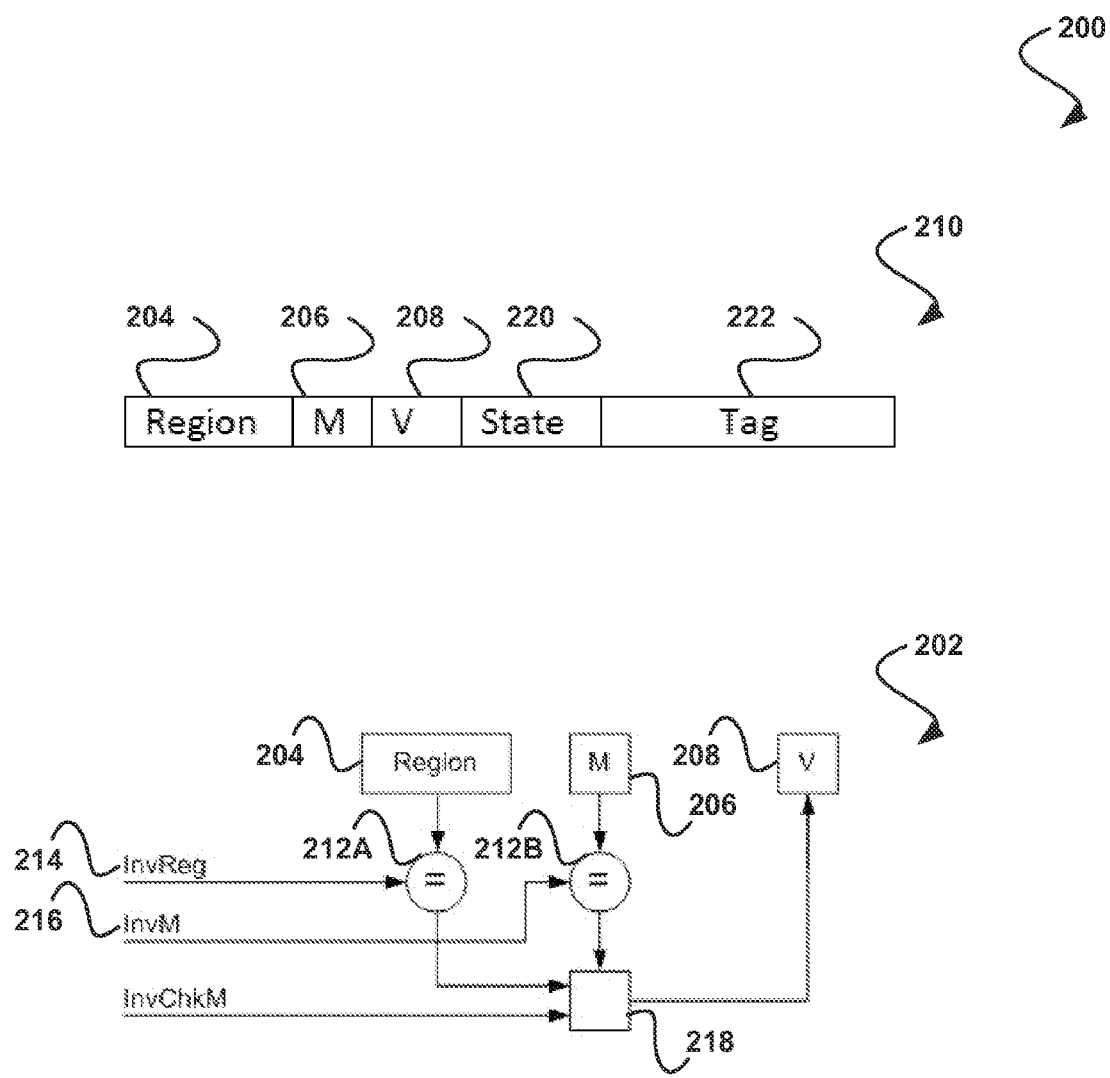
FIG. 2 shows an exemplary content-addressable memory (CAM) system, in accordance with another embodiment.

FIG. 2 shows an exemplary content-addressable memory (CAM) system 200, in accordance with another embodiment. As an option, the exemplary CAM system 200 may be carried out in the context of the functionality of FIG. 1. Of course, however, the exemplary CAM system 200 may be implemented in any desired environment. It should also be noted that the aforementioned definitions may apply during the present description.

As shown, the CAM system 200 includes a CAM 202 that accesses a region field 204, a modified bit 206, and a valid bit 208 of a directory portion of a cache line 210 located within a directory of a cache. In one embodiment, the CAM 202 may be incorporated into a random access memory (RAM) design using standard CAM circuit design techniques. In another embodiment, the CAM circuit may be created by adding one or more transistors to a static random-access memory (SRAM) cell. In yet another embodiment, the CAM circuit may be created utilizing one or more flip flops and/or latch arrays. Of course, however, the CAM circuit may be created in any manner.

Also, in one embodiment, the region field 204 may include an identifier of a region to which the cache line 210 belongs. In yet another embodiment, the modified bit 206 may include an indication as to whether the cache line has been modified. For example, a "true" value or value of one for the modified bit 206 may indicate that the cache line 210 has been modified, and a "false" value or value of zero for the modified bit 206 may indicate that the cache line 210 has not been modified.

Additionally, in one embodiment, the valid bit 208 of the cache line 210 may include an indication as to whether the cache line 210 is valid. For example, a "true" value or value of one for the valid bit 208 may indicate that the cache line 210 is currently valid, and a "false" value or value of zero for the valid bit 208 may indicate that the cache line 210 is currently invalid. Also, the cache line 210 includes a state field 220 and a tag field 222.

In one embodiment, the state field 220 may include data that describes a portion of the state of the cache line 210 that is not covered by the modified bit 206 and the valid bit 208. In another embodiment, the tag field 222 may include high bits of a line address of the cache line 210. In yet another embodiment, a set of the cache that the cache line 210 belongs to may identify the low bits of the line address of the cache line 210.

Further, the CAM 202 includes a region input 214 and a modified input 216. In one embodiment, the region input 214 may include a means to input an identifier of a region to be invalidated. In another embodiment, the modified input 216 may include a means to input a "false" indication (e.g., a numeric zero, etc.). Further still, the CAM 202 includes comparators 212A and B. In one embodiment, comparators 212A and B may provide a "true" value (e.g., a numerical value of one, etc.) if the elements being compared are equal. In another embodiment, comparators 212A and B may provide a "false" value (e.g., a numerical value of zero, etc.) if the elements being compared are not equal.

In one embodiment, the CAM 202 may retrieve a region identifier from the region field 204 of the cache line 210 and may receive an input region value via the region input 214. Additionally, the comparator 212A may compare the region identifier retrieved from the region field 204 to the input region value received from the region input 214. Further, the CAM 202 may retrieve a "true" or "false" value from the modified bit 206 of the cache line 210 and may receive a "true" or "false" indication via the modified input 216. Additionally, the comparator 212B may compare the "true" or "false" value from the modified bit 206 to the input "true" or "false" value received from the modified input 216.

Further still, in one embodiment, if it is determined by the comparator 212A that the region identifier retrieved from the region field 204 is equal to the input region value received from the region input 214, then the comparator 212A may return a "true" value to a clearing element 218. In another embodiment, if it is determined by the comparator 212B that the "true" or "false" value retrieved from the modified bit 206 is equal to the input region value received from the modified input 216 of "false", then the comparator 212A may return a "true" value to a clearing element 218.

Also, in one embodiment, if it is determined at the clearing element 218 that both comparators 212A and 212B returned "true" values, then the clearing element 218 may clear the valid bit 208 of the cache line 210 (e.g., by setting the valid bit 208 to "false," a numeric zero, etc.). In this way, if the region associated with the cache line matches an input region, and the cache line is determined to be unmodified, the cache line may be invalidated, such that valid bits of cache lines that overlap a predetermined region may be flash cleared.

In addition, in one embodiment, one or more wildcards may be included in the input region value received via the region input 214. For example, an input region value of "1X0" may be input via the region input 214, where the "X" is a wildcard value that could be either one or zero, such that both regions "110" and "100" are addressed by the input region value. In this way, one or more bits of the input region value may be specified as "don't cares," and multiple regions may therefore be simultaneously addressed by the CAM 202.

Figure 3:
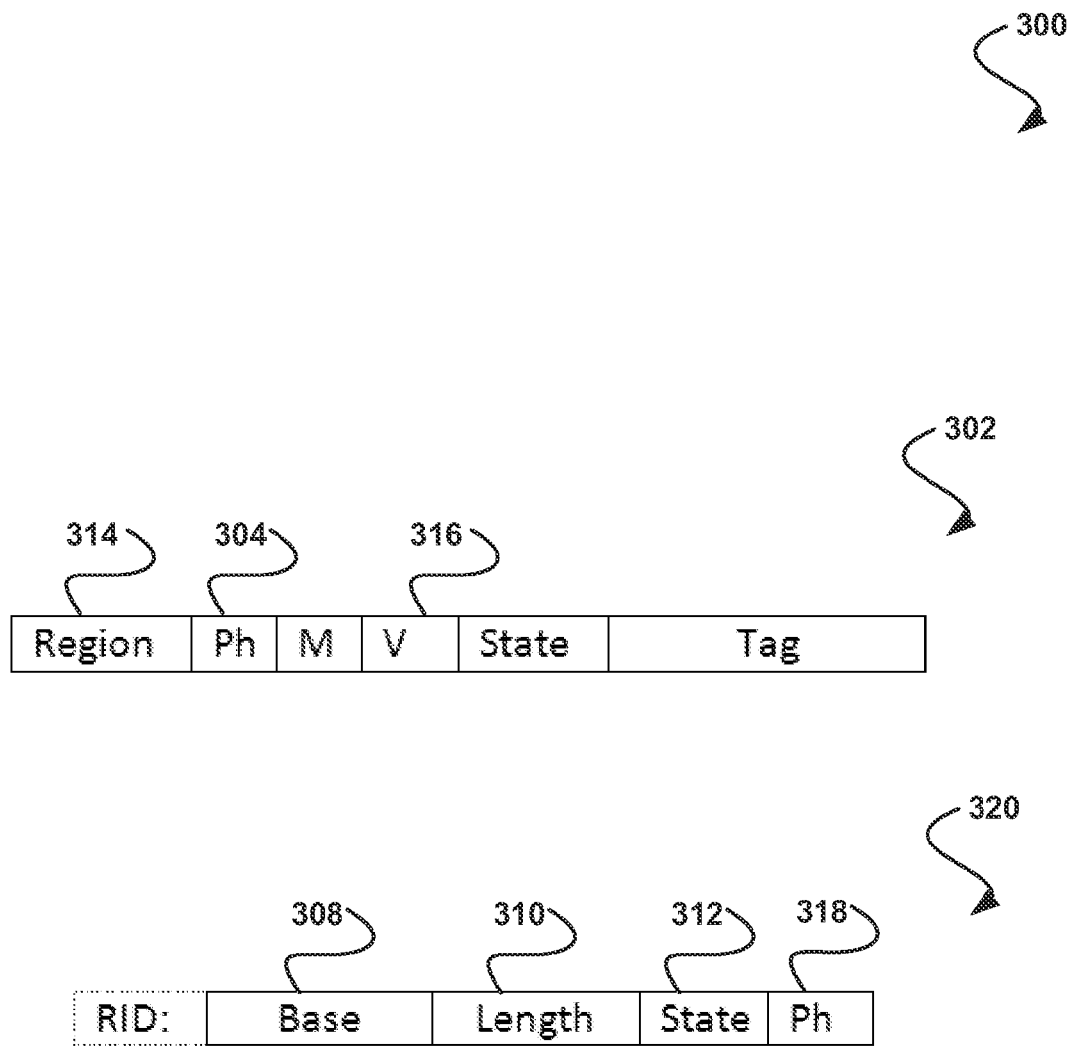
FIG. 3 shows an exemplary region phase system, in accordance with another embodiment.

FIG. 3 shows an exemplary region phase system 300, in accordance with another embodiment. As an option, the region phase system 300 may be carried out in the context of the functionality of FIGS. 1-2. Of course, however, the region phase system 300 may be implemented in any desired environment, it should also be noted that the aforementioned definitions may apply during the present description.

As shown, a directory portion of a cache line 302 includes a phase field 304. In one embodiment, the phase field 304 may be a single bit in size. In another embodiment, the phase field 304 may be a plurality of bits in size. In yet another embodiment, the phase field 304 may be located within a directory of a cache. Additionally, a region register 320 includes a phase field 318 in addition to a base field 308, a length field 310, and a state field 312.

Additionally, in one embodiment, the region register 320 may be associated with a particular region of memory. In another embodiment, the base field 308 may include a starting physical address of a region. In yet another embodiment, the length field 310 may include a length of the region in bytes. In still another embodiment, the state field 318 may include a current state of the region. For example, the state field 318 may store an "R" indication if the region is currently in a read-only state. Also, the state field 318 may store a "P" indication if the region is currently in a private state, and the state field 318 may store a "C" indication if the region is currently in a cache-coherent state.

Further, in one embodiment, the cache line 302 having a region field 314 matching the region register 320's region ID (i.e., the identifier of the region register) may be considered valid only if the phase field 304 of the cache line 302 matches the phase field 318 of the region register 320 and the valid bit 316 of the cache line 302 is set (e.g., set to "true," etc.). In this way, the phase field 304 of the cache line 302 may be incremented in order to invalidate the cache line 302 as well as all other cache lines within the region (e.g., having a region field 314 matching the region register 320's region ID).

Further still, in one embodiment, a background state machine may use idle cache directory cycles to walk a directory of a cache, clearing the valid bits of cache lines having a different phase field value than their associated region register. In another embodiment, the clearing process may need to be completed before the phase field of the region register can wrap around and reuse a previous code. In yet another embodiment, the phase of each region may be maintained independently for each cache, and there may be no need to synchronize phases across caches.

Figure 4:
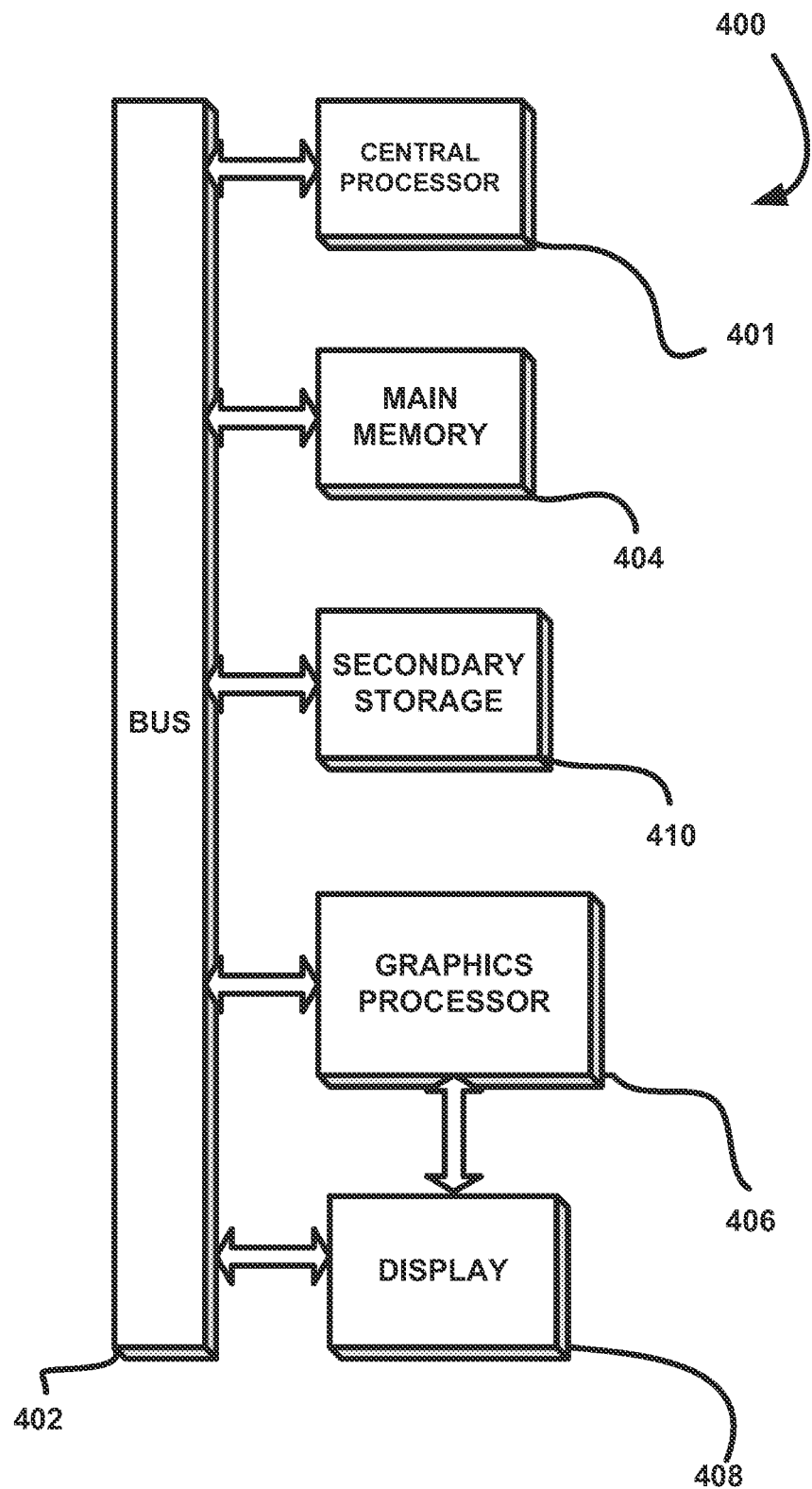
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   invalidating one or more cache lines that hold data from within a region of a memory address space,
   wherein invalidating the one or more cache lines includes:
      identifying a region register that corresponds to the region of the memory address space, and
      comparing a phase field of a cache line within the cache to a phase field of the identified region register.

2. The method of claim 1, wherein invalidating the one or more cache lines includes adding a region field to each cache line within the cache.

3. The method of claim 1, wherein invalidating the one or more cache lines includes receiving a region identifier.

4. The method of claim 3, wherein invalidating the one or more cache lines includes determining for each cache line within the cache whether a region identifier of that cache line matches the received region identifier.

5. The method of claim 4, wherein invalidating the one or more cache lines includes, for each cache line within the cache, clearing a valid field of the cache line if the region identifier of that cache line matches the received region identifier.

6. The method of claim 5, wherein the valid field of a cache line includes a single bit, and clearing the valid field of a cache line includes turning the valid field to zero or false.

7. The method of claim 1, wherein each cache line in a directory of the cache includes one or more bits that are designated as a modified field.

8. The method of claim 7, wherein during a comparison of a region field of each cache line within the cache to a received region identifier, the modified field of each cache line within the cache is compared to zero or false.

9. The method of claim 8, wherein for each cache line within the cache, a valid field of the cache line is cleared if the region identifier of that cache line matches the received region identifier and the modified field of that cache line matches zero or false.

10. The method of claim 3, wherein a wildcard bit is substituted for a bit in the received region identifier.

11. The method of claim 2, wherein invalidating the one or more cache lines includes adding a phase field to each cache line within the cache.

12. The method of claim 1, wherein invalidating the one or more cache lines includes adding a phase field to each region register within the cache.

13. The method of claim 1, wherein invalidating the one or more cache lines includes altering a phase field of the identified region register.

14. The method of claim 1, wherein invalidating the one or more cache lines includes turning a valid field of each cache line that has a phase field that does not match the phase field of its corresponding region register to false.

15. The method of claim 14, wherein the phase field comparing and the conditional valid field clearing are performed by a background state machine.

16. A computer program product embodied on a non-transitory computer readable medium, comprising:
   code for invalidating one or more cache lines that hold data from within a region of a memory address space,
   wherein invalidating the one or more cache lines includes:
      identifying a region register that corresponds to the region of the memory address space, and
      comparing a phase field of a cache line within the cache to a phase field of the identified region register.

17. A system, comprising:
   a content-addressable memory (CAM) for invalidating one or more cache lines that hold data from within a region of a memory address space,
   wherein invalidating the one or more cache lines includes:
      identifying a region register that corresponds to the region of the memory address space, and
      comparing a phase field of a cache line within the cache to a phase field of the identified region register.

18. A system, comprising:
   a random-access memory (RAM) for invalidating one or more cache lines that hold data from within a region of a memory address space,
   wherein invalidating the one or more cache lines includes:
      identifying a region register that corresponds to the region of the memory address space, and
      comparing a phase field of a cache line within the cache to a phase field of the identified region register.

* * * * *